E. E. COLE.
VEHICLE WHEEL.
APPLICATION FILED FEB. 23, 1918.
1,325,779.  Patented Dec. 23, 1919.
3 SHEETS—SHEET 3.
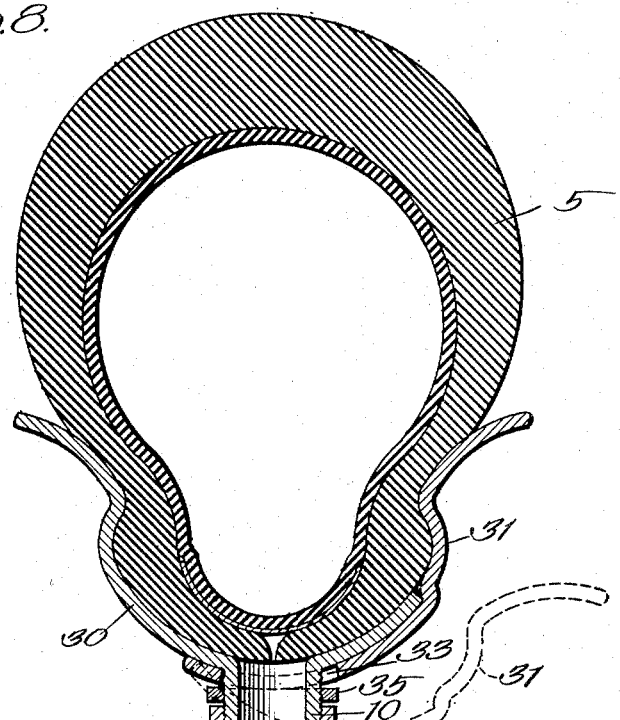
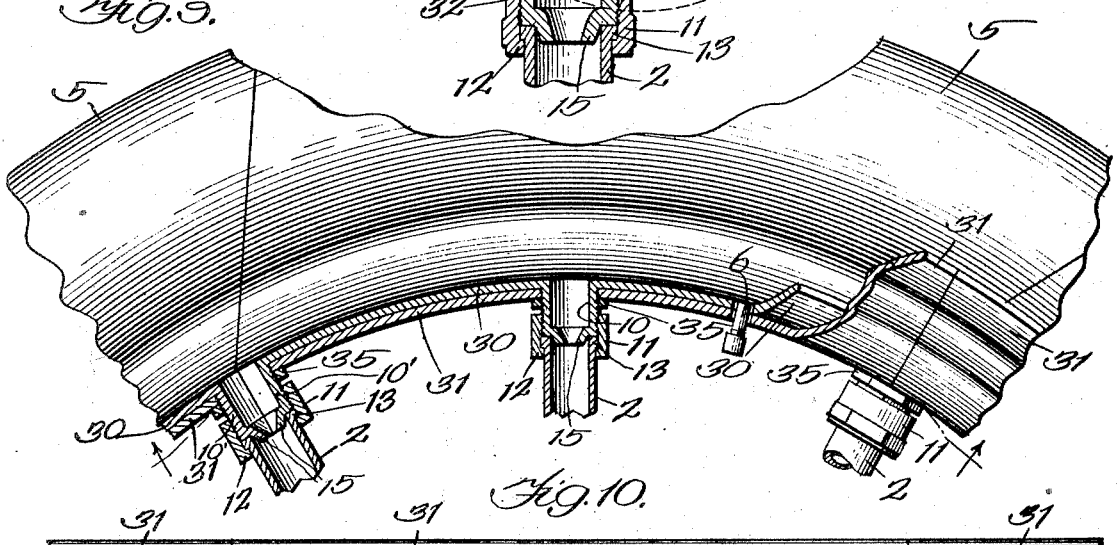
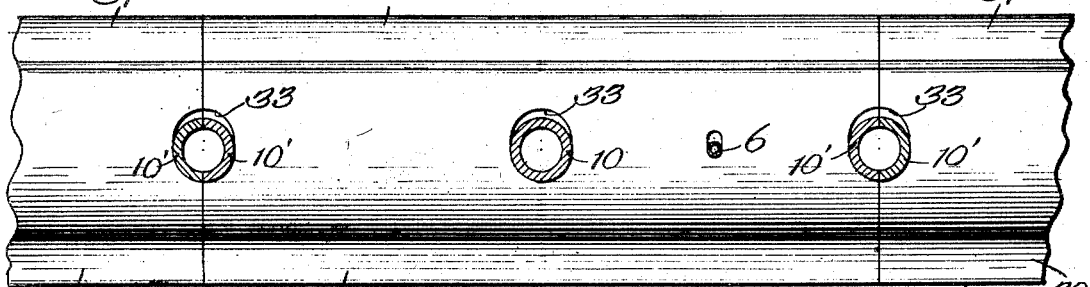
Inventor:
Ernest E. Cole.
By Cheever & Cox Attys

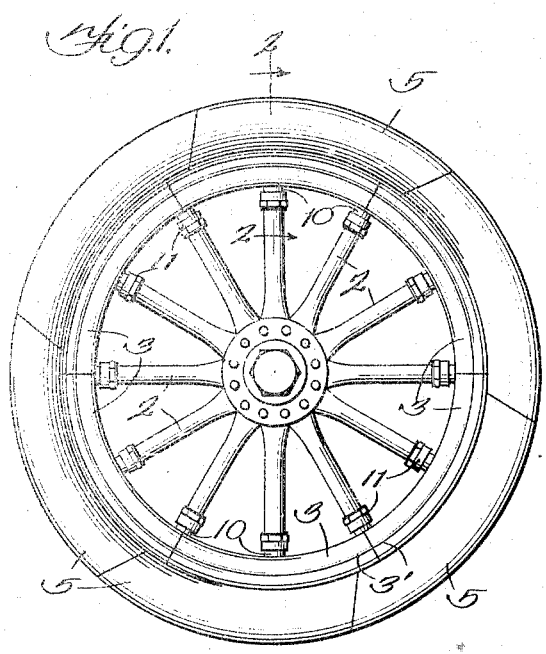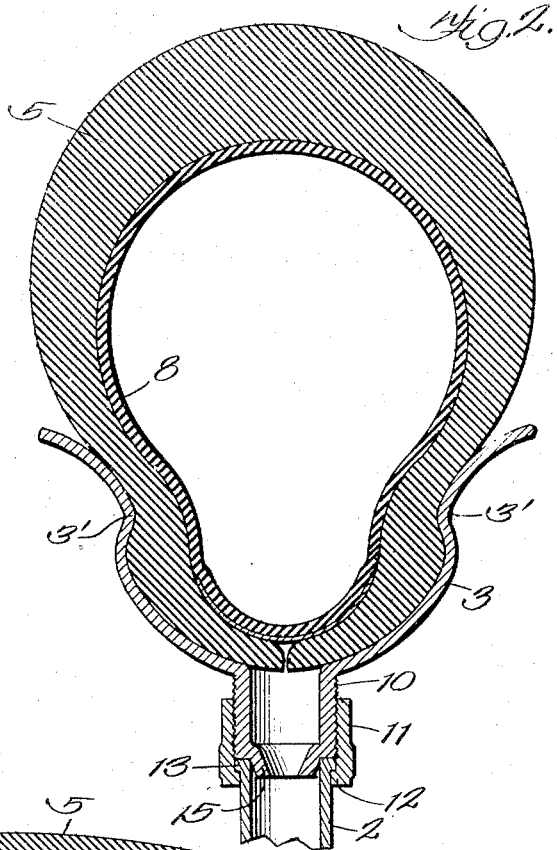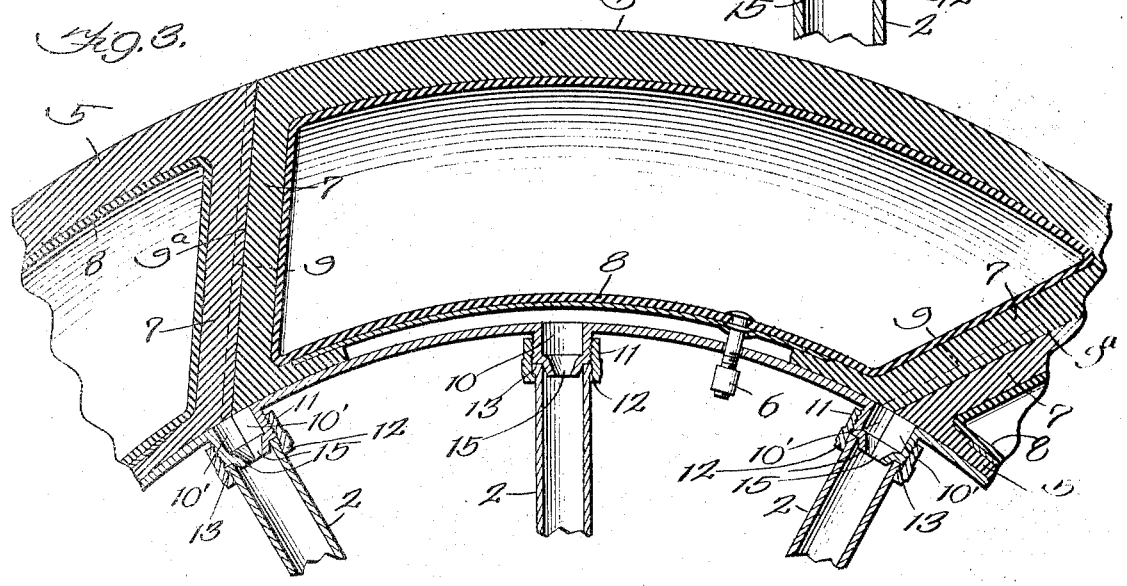

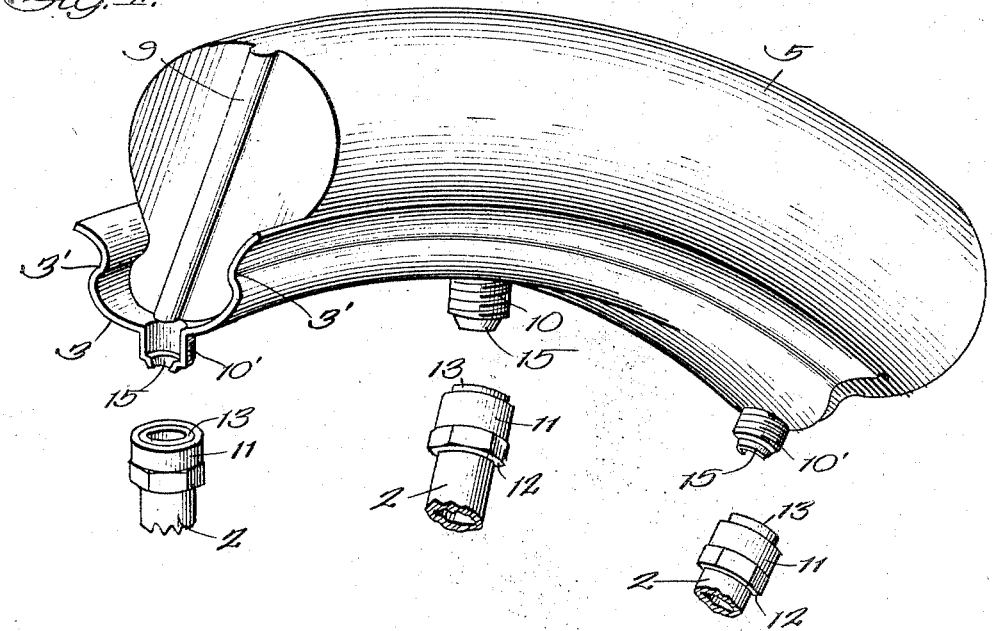
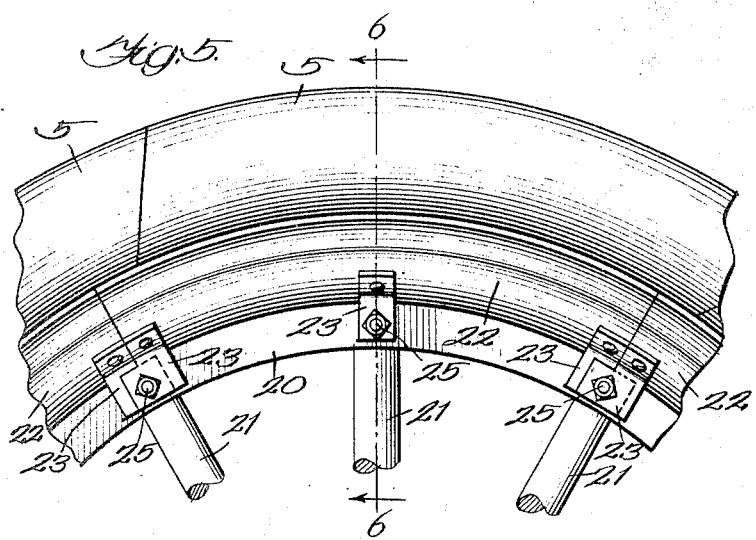
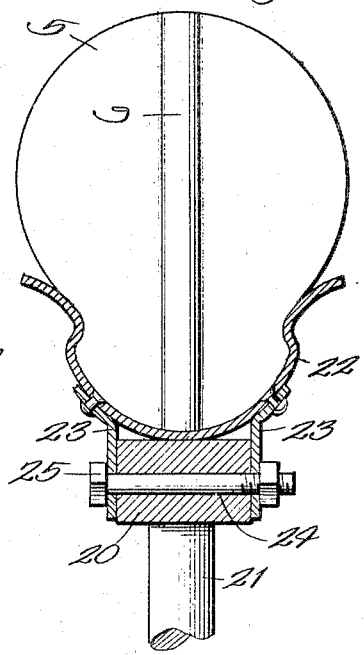
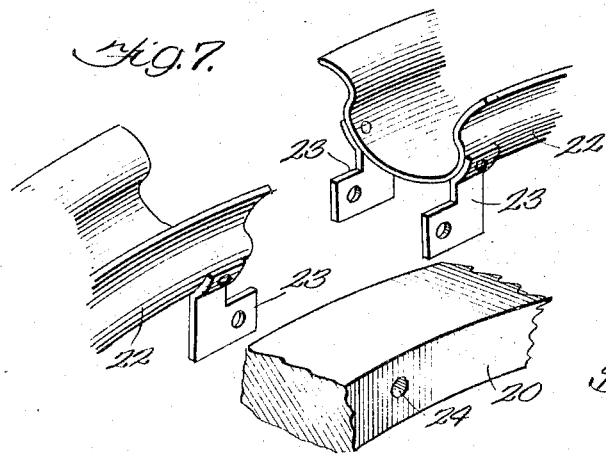

UNITED STATES PATENT OFFICE.

ERNEST E. COLE, OF CHICAGO, ILLINOIS.

VEHICLE-WHEEL.

1,325,779.　　　　　Specification of Letters Patent.　　Patented Dec. 23, 1919.

Application filed February 23, 1918. Serial No. 218,892.

*To all whom it may concern:*

Be it known that I, ERNEST E. COLE, a citizen of the United States, residing at Chicago, in the county of Cook and State of Illinois, have invented a certain new and useful Improvement in Vehicle-Wheels, of which the following is a specification.

My invention relates to vehicle wheels, more especially those designed for motor vehicles having pneumatic tires. It is common knowledge that pneumatic or inflatable tires are frequently, without warning, rendered unfit for service as a result of punctures or blow-outs. In the case of punctures particularly, the tire may be quite undamaged except in a single spot and yet under the more common practice now in vogue, it is necessary to remove the entire tire and either repair it on the spot or substitute a fresh tire. To repair the tire on the spot is frequently impossible and always troublesome. On the other hand, it involves considerable expense to keep a set of spare tires on hand. In Patent No. 1,239,886, issued to me September 11, 1917, I have shown a tire construction in which the inflatable parts are formed in sectors which meet end to end, the thought being that when damage occurs but a single sector need be replaced. With the design there shown, however, the process of replacing a damaged sector is not as simple as might be desired and the general purpose of my present invention is to provide a construction which will simplify the act of replacement. Speaking generally, I carry out my invention by providing a sectional rim having sectors meeting end to end, each sector being provided with a tire sector of its own, which is fastened to it, with the result that the damaged tire sector is replaced by merely replacing a sector of the rim. Pneumatic tires are, of course, made in part or in whole of rubber or other resilient material which is more or less tender and calls for special fastening devices and considerable care and judgment in using them, whereas, the rims and the spokes are rigid and can support much stouter connections which can be handled with much greater impunity. Among the contributory objects of the invention it is my purpose to provide a special form of mechanism for connecting the rim sectors to the spokes and to provide other details of construction which will become apparent as the description proceeds.

I obtain my objects by the constructions illustrated in the accompanying drawings, in which:

Figure 1 is a side view of a wheel embodying my invention. Fig. 2 is an enlarged section taken on a radial plane. Fig. 3 is a section taken on a plane parallel with the plane of the wheel and passing through the centers of the spokes. Fig. 4 is a perspective view showing a single rim sector with its attached tire sector and showing the relationship to the ends of the spokes. Fig. 5 is a side view of a portion of the rim of a modified form of wheel. Fig. 6 is a sectional view on the line 6, 6, Fig. 5. Fig. 7 is a fragmentary perspective view showing the method of joining the rim sectors together and to the felly of the wheel in the type shown in Figs. 5 and 6. Fig. 8 is a cross section showing a second modification in which the rim sector is formed in two pieces, arranged longitudinally, for facilitating the placing of the tire sector in the rim. Fig. 9 is a view of the type shown in Fig. 8, the view being chiefly in longitudinal section. Fig. 10 is a bottom plan view of the parts shown in Figs. 8 and 9.

Similar numerals refer to similar parts throughout the several views.

Referring first to the type shown in Figs. 1 to 4 inclusive, the wheel has a hub 1 and spokes 2. The ribs formed in sectors 3 which meet end to end and are formed of metal thick and strong enough to dispense with the need of a wooden felly as in the type shown in Figs. 5 to 7. The particular configuration, considered in cross section, may be varied, although I prefer to provide terminal shoulders 3′ which assist in holding in place the tire sector 5. The tire sectors are provided with suitable air connections 6. Each sector is complete in itself, having end walls 7 which are preferably formed on a slant, which produces easier riding and increases the life of the tire. An inner tube 8 is provided for retaining the air. The ends of the tire sectors are provided with interlocking connection,—in this instance a radially disposed rib 9 at one end fitting into a corresponding recess 9ᵃ at the contiguous end of the adjacent sector.

Each rim sector has a threaded boss or nipple 10 projecting radially inward in line with one of the spokes. These nipples are permissibly formed integral with the rim and are externally threaded to engage the internal thread of the cylindrical nuts 11 by which the nipples are connected to the spokes. The nuts have internal flanges 12 which coöperate with external flanges 13 formed annularly on the ends of the spokes with the result that when the nuts are screwed up tight they will hold the ends of the nipples rigidly in contact with the ends of the spokes. In the preferred construction, however, the nuts are enlarged somewhat which permits considerable play prior to the time that the nut is tightened up on the nipple. This makes it possible to connect up the parts in spite of the fact that the spokes stand at an angle to each other. In other words, by providing for a certain amount of play between the nuts and the spokes, the parts can be assembled in spite of the angularity of the spokes. To assist in assembling the parts and to increase the rigidity of connection it is desirable to form a conical rim 15 at the end of the nipple which projects a short distance into the end of the hollow spoke, as best shown in Figs. 2 and 3.

By preference, a single rim sector subtends an angle equal to twice the angular distance between spokes. With this construction I have so arranged the parts that one spoke comes to the middle of the sector and the two adjacent spokes come at the two ends of the sector as clearly illustrated in Figs. 3 and 4. At the center of the rim sector the nipple 10 is a complete nipple while at the ends, half nipples 10' are formed. Two half nipples, belonging to contiguous rim sectors meet upon a plane lying transverse to the plane of the wheel and passing through the center of the adjacent spoke. Thus, two half nipples form the equivalent of a whole nipple and when the nut 11 is screwed up tight on these two half nipples, it binds them together and consequently serves as a fastening means for rigidly connecting the contiguous ends of the sectors. The sectors themselves meet end to end and consequently brace each other and the ultimate result of this construction, taken together with the fact that each rim sector is connected to three different spokes is that a very rigid wheel is produced when the parts are in place.

In practice, if any part of the tire becomes damaged, all the operator has to do is to back off the three nuts that hold the rim sector in place, put in a spare sector accompanied by its tire sector, and screw the nuts up again onto the nipples of the fresh sector. This is a very simple operation and can be done with ease by a single person without any assistance. Furthermore, a wrench is the only tool required. The motorist may provide himself with a number of these wheel sections at a very much smaller expense than would be entailed in keeping as many spare tires on hand.

The form shown in Figs. 5, 6 and 7 is practically the same as the form shown in Figs. 1 to 4 except that in this case the wheel has a felly 20,—by which I mean a wooden rim permanently fastened to the spokes 21 and forming a support for the rim sectors 22. The rim sectors are of the same shape as before but instead of being provided with threaded nipples 10, have lugs 23 fastened to them which extend down over the sides of the felly and are apertured to register with an aperture 24 passing through the felly for accommodating the bolt 25. The parts as assembled are best shown in Fig. 6. By preference, the lugs 23 at the ends of the sectors overlap each other so that a single bolt serves to fasten both rim sectors to the felly. In using this form, when a tire sector becomes damaged, the only thing required is to remove three bolts, place in a fresh section, and bolt it in place.

Referring now to the types shown in Figs. 8, 9 and 10: The tire sector 5 is the same as before, but the rim sector instead of being solid or of one piece as in the previously described types, is of two pieces 30 and 31. These overlap each other and, being separate, are movable relatively to each other and thus facilitate the placing of the tire sector. The inner part 30 has a greater portion of its surface in contact with the tire than the outer part 31. It carries the nipples 32 which are similar to the nipples heretofore described. Part 31 has apertures 33 for accommodating the nipples. These apertures are slightly elongated crosswise of the wheel and thus permit the part 31 to be dropped down to the dotted line position shown in Fig. 8. This permits the tire to be inserted when a clencher type of tire is used. After the tire has been inserted, nut 35 is screwed up on the nipple until part 31 is held fast, at which time the nipple comes at the end of the slot in such manner as to effectually prevent spreading of the parts 30, 31. Consequently, the construction is rigid and strong. After the nut 35 has been screwed up, the nuts 11 are screwed up tight and the rim thereby fastened in the manner previously described.

Having thus described my invention, what I claim as new and desire to secure by Letters Patent, is:

1. A vehicle wheel having in combination with the hub and spokes, a rim formed in sections each subtending a definite arc, said sections being individually attachable to and detachable from the spokes and each being provided with a section of resilient tire, whereby if a tire section becomes unusable, a repair can be made by removing the old and substituting a fresh rim section.

2. A vehicle wheel having a hub, spokes, a rim formed in detachable sectors, said sectors being attachable both to the spokes and to each other, and tire sectors complete in themselves attached to the rim sectors and being substantially coextensive in length therewith.

3. A vehicle wheel having a hub, spokes, a rim formed in sectors individually attachable to and detachable from the spokes, an inflatable tire sector secured to each rim sector, the tire sectors having end walls whereby each one is complete in itself, said tire sectors having mating ends, one with a projection and the other with a recess for receiving it for preventing relative displacement.

4. A vehicle wheel having a hub, spokes, a rim formed in sectors individually attachable to and detachable from the spokes, a tire sector secured to each rim sector, and the rim sectors having flanges engaging the sides of the tire sectors for preventing displacement transverse to the plane of the wheel, one end of each tire sector having a radially arranged rib fitting into a radially arranged recess in the contiguous end of the adjacent tire sector for holding the ends interlocked.

5. A vehicle wheel having a hub, spokes, a rim formed in sectors, a tire formed in sectors located on the rim sectors, each tire sector being selfcontained and substantially coterminate with its rim sector, and screw connections between the spokes and the rim sectors, said connections comprising a threaded nipple on one part, a flange on the coöperating part and a hollow nut screwing onto the nipple and having a flange engaging the first mentioned flange, the flanges engaging each other loosely prior to the tightening of the nut, to thereby allow for the angularity of the spokes.

6. A vehicle wheel having a hub, spokes, a rim formed in sectors, a tire formed in sectors located on the rim sectors, each tire sector being selfcontained and substantially coterminate with its rim sector, the rim sectors having threaded half nipples at their ends matching similar half nipples at the contiguous ends of the adjacent rim sectors, the nipples projecting radially inward and being alined with spokes of the wheel, said spokes having hollow internally threaded nuts connected thereto and rotatable thereon for encircling the half nipples and thus binding them together in parts and at the same time connecting the spoke to two adjacent rim sectors.

7. A vehicle wheel having a hub, spokes, a sectional tire of the clencher type, a rim formed in sectors, each sector comprising two parts, one part being stationary by being rigidly secured to the spokes and the other part overlapping the stationary part and being articulately connected thereto to permit the insertion of the tire, and means for rigidly securing the movable part of the rim sector to the stationary part, the tire sectors and rim sectors being equal in number and substantially coterminate.

8. A vehicle wheel having a hub, spokes, a sectional tire of the clencher type, a rim formed in sectors, each sector comprising a stationary part and a movable part overlapping it, the stationary part having nipples coupled to the spokes, the movable part having apertures accommodating the nipples loosely, whereby the tire may be inserted, the nipples being threaded and having a nut for tightening the movable part of the sector upon the stationary part of the sector, the tire sectors and rim sectors being substantially coterminate.

9. A vehicle wheel having a hub, spokes, a tire of the clencher type formed in sectors, a rim also formed in sectors coterminate with the tire sectors, each sector comprising a stationary and a movable part whereby the tire sector may be inserted, the stationary part having nipples coupled to the spokes and the movable part overlapping and having apertures accommodating the nipples, the apertures being elongated and the nipples engaging the ends of the apertures when the parts are in acting condition, the nipples being threaded and having nuts for tightening the movable part of the sector upon the stationary part thereof.

In witness whereof I have hereunto subscribed my name.

ERNEST E. COLE.